United States Patent [19]

Goldner

[11] Patent Number: 4,589,895
[45] Date of Patent: May 20, 1986

[54] GAS LINE DUST TRAP

[76] Inventor: Erwin P. Goldner, 2727 Felton St., San Diego, Calif. 92104

[21] Appl. No.: 618,550

[22] Filed: Jun. 8, 1984

[51] Int. Cl.⁴ .............................................. B01D 46/02
[52] U.S. Cl. ....................................... 55/357; 55/375; 55/379; 55/507; 55/509
[58] Field of Search ................. 55/356, 357, 374, 375, 55/378, 379, 502, 503, 507, 509; 210/238, 232, 448, 449, 486

[56] References Cited

U.S. PATENT DOCUMENTS

| | | | |
|---|---|---|---|
| 945,763 | 1/1910 | Disbrow | 210/238 |
| 1,218,975 | 3/1917 | Brison | 55/379 X |
| 2,145,047 | 1/1939 | Goldkamp | 55/379 X |
| 3,358,839 | 12/1967 | Simons | 210/448 X |
| 3,481,479 | 12/1969 | Hoskins et al. | 210/486 X |
| 3,618,300 | 11/1971 | Pausch | 55/502 X |
| 3,633,753 | 1/1972 | Petitjean | 55/378 X |
| 3,633,757 | 1/1972 | Madern | 55/379 X |
| 4,045,350 | 8/1977 | Kupf et al. | 210/486 X |
| 4,057,500 | 11/1977 | Wager | 210/486 X |

FOREIGN PATENT DOCUMENTS 8260 of 1915 United Kingdom .................. 55/509

Primary Examiner—Kathleen J. Prunner
Attorney, Agent, or Firm—Charmasson & Holz

[57] ABSTRACT

A dust trap for trapping particles such as dust in a gas pipe between a street tap and a diaphragm type regulator comprises a dust bag for trapping the dust and a retaining member for holding the dust bag in the pipe. The retaining member is of deformable material and has an outer portion of increased diameter for force-fitting the member in the pipe, and a neck portion over which the end of the dust bag is placed and securely held, for example by an outer sleeve fitted over the neck portion.

2 Claims, 3 Drawing Figures

4,589,895

GAS LINE DUST TRAP

BACKGROUND OF THE INVENTION

Dust traps are used in gas lines to remove dust particles which otherwise would clog diaphragm-like regulators which are used to reduce the gas pressure between street gas mains and diversions to individual homes.

Dust is caused by residuals from manufacturing gas accumulating inside gas pipes. The problem is aggravated when gas pressure is increased and raises more dust. This happens, for example, when new extensions are added to old gas networks. As a city grows more and more gas pipes are added to the original networks. Gas pressure is then increased through the older pipes in the older part of the city to increase flow. The increased flow will loosen or raise more dust and increase the problem of dust in both the old and new parts of the network.

In the prior art this problem is overcome by inserting a filer bag or sleeve into the gas pipe. The bag is retained on a coil spring held within a bushing having inner and outer threads. The bushing is screwed into a threaded end of the gas pipe. The problems with this solution are that the bushing is relatively expensive and that gas pipe must be provided with an inner thread for holding the bushing. Also, it is difficult to remove the bushing from the pipe since dust will tend to accumulate in the thread grooves, making removal difficult.

SUMMARY OF THE INVENTION

It is an object of the present invention to provide a gas line dust trap which does not require any modification of the gas pipe itself for installation, and which is relatively easy to insert in and remove from the gas pipe.

According to the present invention a dust trap for a gas pipe line is provided, which comprises a dust bag and a member of deformable material for retaining the dust bag in the pipe. The member has a central bore, an outer portion of increased diameter dimensioned for force fitting the member in the pipe, and a neck portion over which the end of the bag is placed. The end of the bag is held securely on the neck portion, for example by means of an outer sleeve which fits over the neck portion and the end of the bag.

The outer portion may comprise a series of parallel rings which are of slightly greater diameter than the inner diameter of the pipe, the rings deform and act as a seal against the inner face of the pipe to grip the member in place in the pipe. Thus the inner face of the end of the pipe does not have to be threaded.

The deformable material is suitably plastics material such as polyethylene, and thus the member is easily replaced. According to a preferred embodiment of the invention a device for removing the member from the pipe is provided. This can be used, for example, when the dust bag needs to be removed for cleaning or replacement or when access to the pipe is needed for other reasons. The removing device comprises a capping part for screwing over the end of the pipe, and a cork-screw part for screwing or forcing into the bore in the retaining member. When the capping part is screwed onto the end of the pipe and the cork-screw part is forced into the retaining member bore, the head of the cork-screw part will bear against a surface of the capping part. Thus if the capping part is unscrewed it will force the cork-screw part and the retaining member backwards out of the pipe.

The dust trap of this invention is relatively easy and inexpensive to manufacture, does not require modifications to the gas pipe for its installation, and is relatively easy to install and to remove from the pipe as necessary.

DESCRIPTION OF THE PREFERRED EMBODIMENT

1. PRIOR ART

Figure 1:
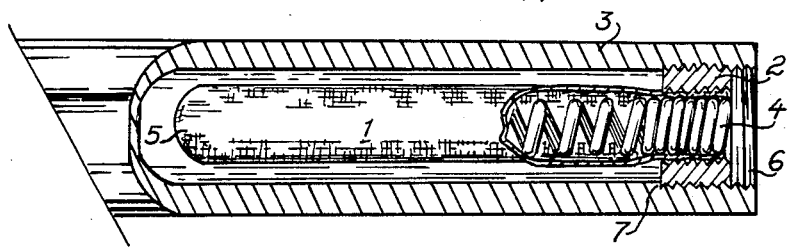
FIG. 1 is a cross-sectional view showing a prior art dust trap installed in the end of a gas pipe.

FIG. 1 shows a prior art dust trap installed in a gas pipe 3, which comprises a dust bag 1, a bushing 2 into which the end of the bag extends, and an inner coil 4 which holds the end of the bag against inner threads on the bushing 2. The inner coil 4 also holds the bag 1 in a non-collapsed state since it projects up to the closed end 5 of the bag. The end of the pipe is provided with inner threads 6 into which outer screw threads 7 provided on the bushing are screwed.

This prior art dust trap has a number of problems. Firstly, the gas pipe must be provided with inner threads into which the bushing can be screwed. The bushing itself is of metal, and is fairly expensive to manufacture since inner and outer threads of different pitch must be provided. Since the pipe has inner threads, the dust in the pipe has a tendency to accumulate in the thread grooves, thus making removal of the threaded bushing difficult. This causes problems when the dust bag has to be cleaned or replaced or when access to the pipe is needed for other reasons.

2. PREFERRED EMBODIMENT OF THE INVENTION

Figure 2:
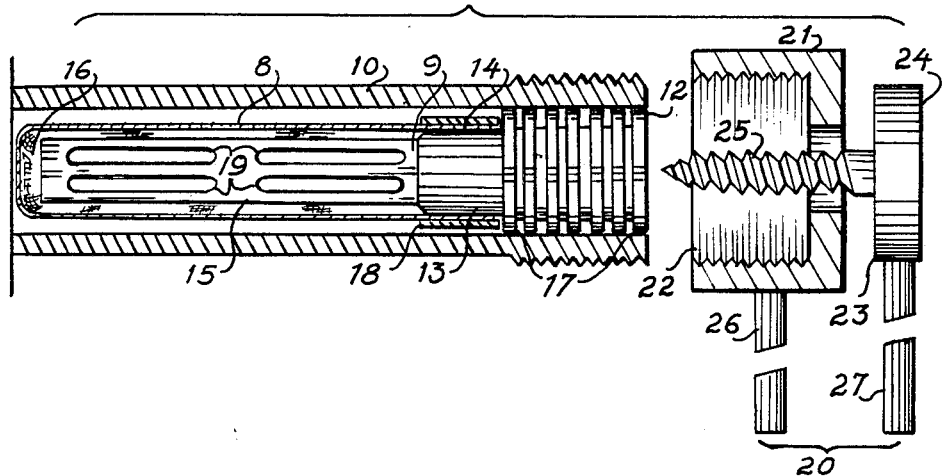
FIG. 2 is a cross-sectional view showing a dust trap according to a preferred embodiment of the invention installed in the end of the gas pipe.
Figure 3:
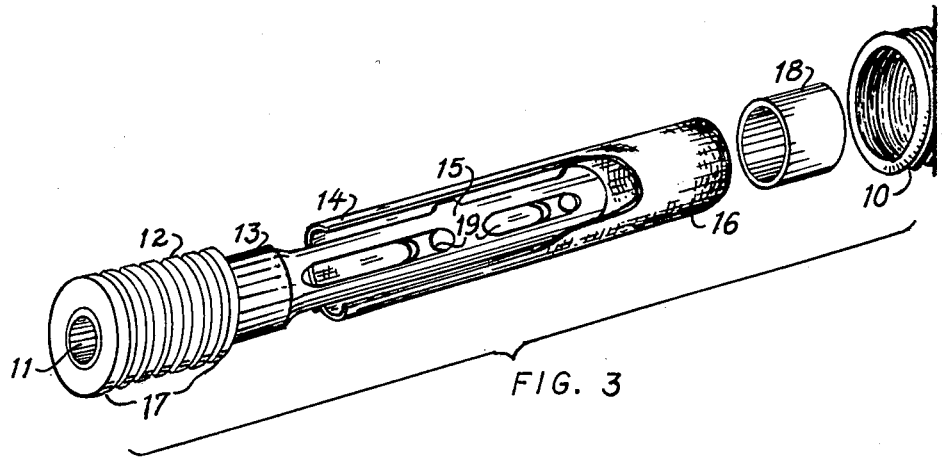
FIG. 3 is a perspective view showing the various parts of the dust trap of FIG. 1 when separated.

FIGS. 2 and 3 show a dust trap according to a preferred embodiment of this invention, in which some or all of the problems of the prior art are reduced or overcome.

As shown in FIGS. 2 and 3, the dust trap basically comprises a dust bag 8 of suitable material for trapping particles of rust, such as a fine mesh cloth, and a retaining member 9 for holding the dust bag 8 within a gas pipe 10.

The retaining member 9 has an inner bore 11, portion 12 at one end of increased diameter, a neck portion 13 depending from the outer portion 12 over which the open end 14 of the bag 8 is held, and a portion 15 projecting within the bag towards the closed end 16 of the bag for holding it in a non-collapsed state.

The member 9 is of deformable material, suitably a plastics material such as polyethylene, and the outer portion 12 comprises a series of parallel rings 17 which are of diameter slightly greater than the inner diameter of the pipe 10. Thus when the member 9 is force-fitted into a pipe as shown in FIG. 2, the rings 17 deform and act against the inner face of the pipe to act as a seal and hold the member 9 in place in the pipe.

A sleeve 18, suitably of the same material as the retaining member 9, fits over the neck portion 13 and the end 14 of the bag to grip the bag on the neck portion.

Thus to assemble the separate parts of the dust trap shown in FIG. 3 for insertion into a gas pipe, the projecting portion 15 of the retaining member 9 is first inserted into the open end 14 of dust bag 8, until the open end is positioned over the neck portion 13. The sleeve 18 is then pulled over the bag 8 and forced onto the neck portion 13, so that the open end 14 of the bag is gripped securely between the neck portion 13 and the sleeve 18.

The projecting portion 15 has a series of openings 19 along its length, which allow gas to flow out of the member 9 and through the side walls of the bag as well as through its closed end. In the illustrated embodiment two sets of four elongate openings or slits are provided, but different arrangements of openings may be used.

As shown in FIG. 2, an assembly 20 is provided for removing the retaining member from the pipe. The assembly 20 comprises a capping member 21 having a central hole and inner threads 22 for screwing over the end of the pipe 10, and a cork-screw member 23 having a head 24 and a threaded shank 25 for screwing or forcing into the open end of the retaining member bore 11. Radial handles 26, 27, respectively are provided on the capping and cork-screw members 21, 23.

To remove the retaining member 9 from the pipe 10, for example when the dust bag 8 needs to be cleaned or replaced or when access to the pipe is needed for other reasons, the capping member 21 is first screwed onto the end of the pipe, using handle 26. The cork-screw member 23 is then projected through the central hole of the capping member 21 and screwed or forced into the bore 11 using the handle 27. The dimensions of the shank 25 are such that the threads will dig into the surface of the bore so that the cork-screw member 23 is firmly gripped in the retaining member. The head 24 of the cork-screw member 23 will then act against the adjacent face of the capping member 21, so that when the capping member 21 is unscrewed it will force the cork-screw member 23 backwards, urging the retaining member 9 out of the pipe 10.

Thus the retaining member 9 and dust bag 8 can be easily removed from the pipe 10 as necessary.

The retaining member 9 is relatively easy and inexpensive to manufacture. It is of plastics material such as polyethylene and thus will not be as liable to jam in the gas pipe as a screw threaded metallic bushing. The entire assembly is relatively easy to assemble and disassemble, and can be readily inserted in and removed from a gas pipe.

While the invention has been particularly shown and described with reference to a preferred embodiment, it will be understood that modifications can be made to the disclosed embodiment without departing from the scope of the invention, which is defined in the appended claims.

What is claimed is:

1. A dust trap in combination with a gas pipe, comprising:
    a dust bag having an open end and a closed end;
    a member of deformable material for retaining the dust bag in the pipe, the member having a central bore, an outer portion dimensioned for force-fitting the member in the pipe, said outer portion having a plurality of parallel rings along its length, and a neck portion over which the open end of the bag is placed; and
    means for holding the open end of the bag on the neck portion.

2. A dust trap in combination with a gas pipe, comprising:
    a dust bag having an open end and a closed end;
    a member of deformable material for retaining the dust bag in the pipe, the member having a central bore, an outer portion dimensioned for force-fitting the member in the pipe, and a neck portion over which the open end of the bag is placed;
    means for holding the open end of the bag on the neck portion; and
    means for removing said member and dust bag from said pipe, said removing means comprising a capping device disposed on an open end of the pipe and having a central hole and a cork-screw projecting through said hold into the bore of the member and having a head portion bearing against an outer face of the capping device, said cork-screw being dimensioned to grip the member about the bore such that the cork-screw and member are forced out of the pipe by removing the capping device.

* * * * *